July 14, 1970 M. C. O'DONNELL ET AL 3,520,596
PROJECTOR
Filed Oct. 27, 1966 3 Sheets-Sheet 2

MILES C. O'DONNELL
ROBERT B. JOHNSON
JOHN M. MORIARTY
ROBERT W. SEEBACH
FRANK D. WOLLSCHLEGER
INVENTORS

BY James A. Smith
Robert W. Hampton
ATTORNEYS

United States Patent Office 3,520,596
Patented July 14, 1970

3,520,596
PROJECTOR
Miles C. O'Donnell, Robert B. Johnson, John M. Moriarty, Robert W. Seebech and Frank D. Wollschleger, Rochester, N.Y., assignors to Eastman Kodak Company, Rochester, N.Y., a corporation of New Jersey
Filed Oct. 27, 1966, Ser. No. 590,067
Int. Cl. G03b 21/38, 21/50
U.S. Cl. 352—92    31 Claims

ABSTRACT OF THE DISCLOSURE

A motion picture projector is provided with electrical controls permitting remote control of various operational modes. The projector is responsive to code markings on the film to automatically transfer from motion to still projection. A timer can control the time of still projection. In addition to motion and still projection during either forward or reverse operation, the projector is capable of forward and reverse single frame modes of projection. The mode changes are synchronized with the position of the film claw. Mechanical manual controls additionally provide for different projection rates. An adjustable lens with motion and still focus positions is automatically appropriately adjusted upon a change from motion to still projection, or vice versa.

---

This invention relates to film projectors and more particularly to projectors for selectively effecting motion and still projection of a film.

Motion picture projectors are known which can be selectively operated in a motion or still mode of projection. For example, in U.S. Pat. No. 3,261,654, to Richard L. Faber et al. which issued on July 19, 1966, and is assigned to the same assignee as the present invention, there is disclosed a skip frame projector which can be selectively adjusted for forward or reverse projection at 54, 18 and 6 frames per second or still projection by positioning of a manual control member. In U.S. Pat. No. 3,165,251 which issued on Jan. 12, 1965 to E. Gerlach, and also assigned to the same assignee as the present invention, there is disclosed an electrically controlled skip frame projector which can be selectively operated at a plurality of speeds.

It is a principal object of the present invention to provide an improved film projector.

Another object of the invention is to remotely control moving and still operational modes of a film projector.

Another object of the invention is to automatically transfer the mode of operation of a film projector from one mode of projection to another in response to a code marking on the film.

Another object of the invention is to provide a remote control circuit for selectively effecting operation of the projector in either forward and reverse motion modes of projection and forward and reverse single frame modes of projection.

Another object of the invention is to effect still projection of selected frames during motion projection of a film.

Other objects and advantages will become apparent from the following description taken in connection with the accompanying drawings wherein:

BASIC PROJECTOR MECHANISM

Referring now to the drawings, the invention is disclosed in connection with a projector mechanism similar to that disclosed in copending application Ser. No. 371,938, filed on June 2, 1964 by Richard L. Faber et al., now Pat. No. 3,261,654, and assigned to the same assignee as the present invention. It will be apparent to those skilled in the art, however, that the invention can be readily applied to other known projectors and that the present disclosure only relates to one preferred embodiment of the invention.

Figures 1, 3, 9:
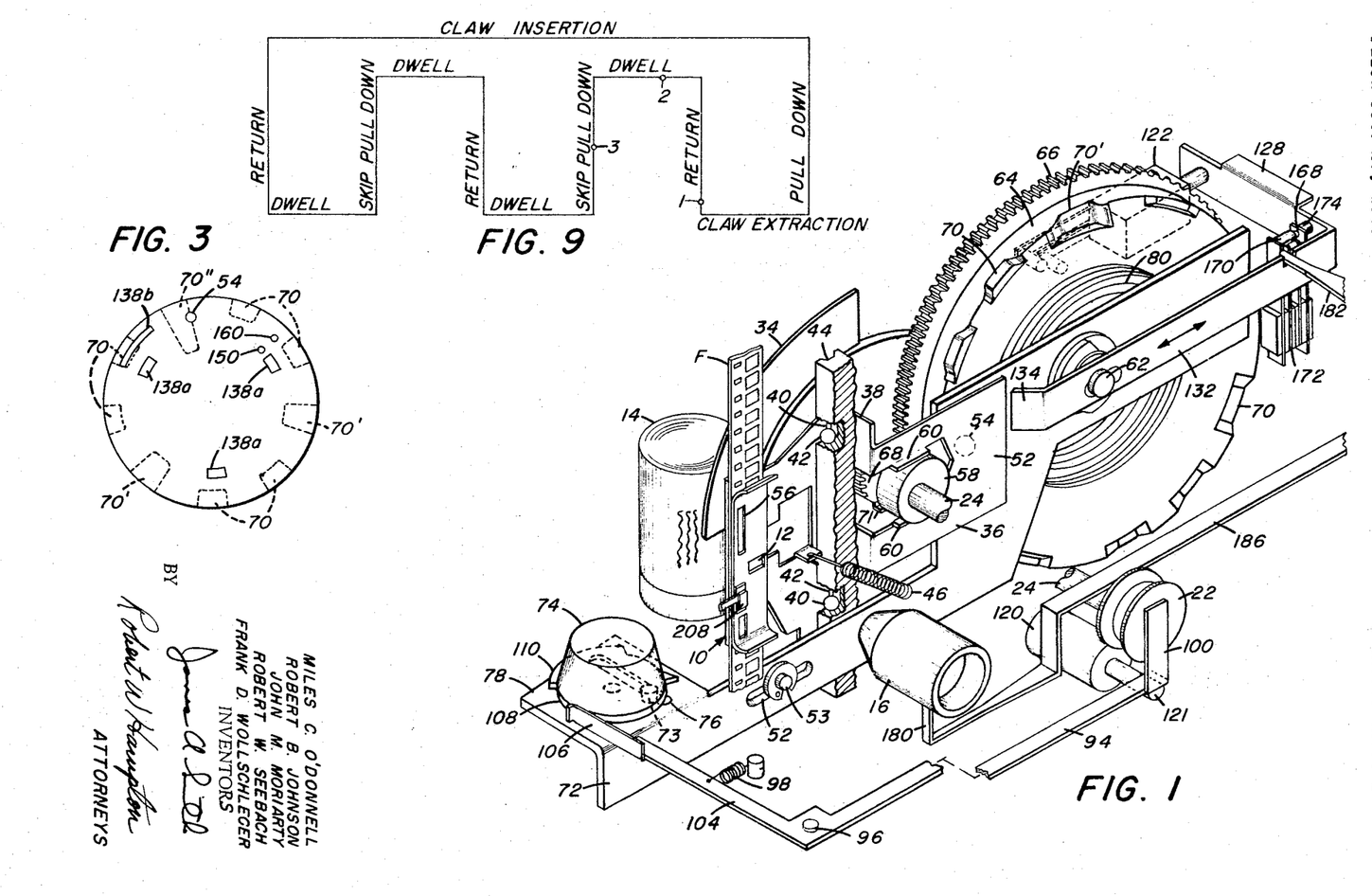
FIG. 1 is a perspective view of a film projector in accordance with the invention.
FIG. 3 is a rear elevational view of the in-and-out face cam shown in FIGS. 1 and 2.
FIG. 9 is a diagram illustrating a pull-down cycle at a film speed of 18 frames per second and the position of two synchronizing switches during the pull-down cycle.
Figure 2:
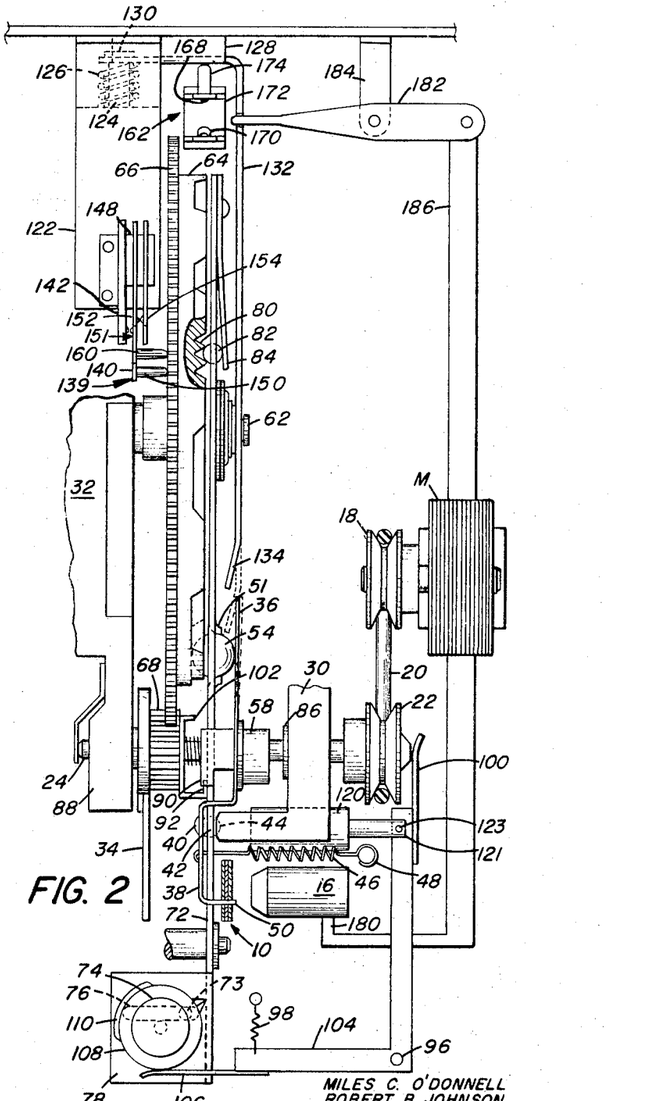
FIG. 2 is a top view in partial section of the structure shown in FIG. 1.

Referring specifically to FIGS. 1 and 2 of the drawings, there are shown the parts of a projector which are necessary to an understanding of the present invention or which are unique in accordance with the preferred embodiment of the present invention. In general, the projector includes a film gate 10 defining an aperture 12 which is illuminated by a lamp 14 located behind the gate 10. A motion picture film F is adapted to be intermittently moved through the gate 10 by a pull-down claw mechanism later to be described. As each frame of the film is moved into alignment with the aperture 12 in the gate 10 it is illuminated by the lamp 14 and projected by a lens system 16. As will later be described in more detail the lens system 16 may be remotely focused for still and motion projection.

The prime mover or drive means of the projector comprises an electric motor M (FIG. 2) driving a drive pulley 18 fixed to the motor drive shaft. The pulley 18 is connected by a belt 20 to a driven pulley 22 fixed to the end of a main drive shaft 24 which lies to one side of, and extends substantially parallel to, the optical axis of the projector. Drive shaft 24 is rotatably and slidably mounted in bearings, not shown, but mounted at 86 and 88 in supporting walls 30 and 32 forming parts of the projector. Under normal load conditions the motor shaft will operate at approximately 3240 r.p.m., or 54 r.p.s. Motors having this operating speed are commercially available. The pulley and belt combination is so chosen that this same frequency of rotation is transmitted to the drive shaft 24. The light beam is cut off from the projection aperture of the gate by a rotating sector shutter 34 connected to the drive shaft 24 in a manner hereinafter described. Since the shutter 34 has but a single cut-off blade it will intercept the light beam at 54 cycles per second and only at the time the film is being moved through the gate, as is well known in the art.

Turning now to the intermittent film feeding mechanism, there is included a rigid claw arm 36 extending laterally of the film to be fed and having an offset portion 38 intermediate its two ends. The claw arm 36 is mounted to move up and down and pivot relative to the film gate 10 by having a pair of vertically spaced ball seats 40 formed in the forward face thereof rotatably seating a pair of spaced ball bearings 42 which are in turn rotatably positioned in a vertical ball race 44 formed in one edge of the forward wall 30 of the projector. The claw arm 36 is held in assembled relation on the ball bearings 42 by a spring 46 one end of which is attached to the claw arm on the side of the pivot point nearest the gate and the other end of which is attached to a pin 48 fixed to the projector. The spring 46, in addition to holding the claw in assembled relation with its ball mountings, also acts to bias one or more film engaging claws 50 on one end of the arm toward the gate 10 and into a film engaging position. In addition the spring 46 also acts to force the other end of the claw arm 36 against a ball 54 which acts as a follower engaging the in-and-out cam means as will be more fully described hereinafter. As is well known, the claw arm will reciprocate up and down on the ball bearings to effect the film advance and will pivot about these ball bearings to move the claw teeth 50 into and out of engagement with the film, the gate being provided with an elongated slot 56 to accommodate the teeth 50 and allow the up-and-down movement of the claw while the teeth 50 are in engagement with the film.

In the arrangement shown, the up-and-down reciprocal movement of the claw arm edgewise for feeding the film is under the control of an up-and-down or pull-down cam 58 fixed to the drive shaft 24 and embraced by a pair of followers 60 fixed to the claw arm 36 and extending substantially at right angles to the vertical ball race 44. Since each revolution of the up-and-down cam 58 produces one complete reciprocal stroke of the claw arm 36 and since the drive shaft is rotating at 54 r.p.s., the claw arm 36 will be reciprocated at a rate of 54 strokes per second.

The in-and-out movement of the pull-down claw relative to the film gate is produced by skip-stroke mechanism which will now be described. Fixed to a shaft 62 rotatably mounted in the wall 32 of the projector and in substantially parallel relation with drive shaft 24 is a wheel or face cam 64 fixed to or carrying a gear 66. Gear 66 is driven by a pinion 68 which is rotatably and slidably mounted on the drive shaft 24 and is selectively coupled thereto by a clutch means to be fully described hereinafter. The shutter 34 is fixed to the pinion 68 to rotate therewith.

The other, or forwardly directed, surface, of the face cam 64 is provided with a plurality of depressions 70, 70', and 70" which are spaced circumferentially about the surface of face cam 64 and have their leading and trailing edges tapered into the surface of the cam so that a follower pressed against the face of the cam can move into and out of the depressions as the cam rotates. These depressions, therefore, constitute cam surfaces which in combination with the surface of the face cam 64 form a series of concentric in-and-out cams whose profiles control the in-and-out movement of the claw. Depressions 70' are approximately twice as long, measured in a radial direction of the face cam as depressions 70, while depression 70" is approximately three times as long as depression 70 measured in the same sense. Accordingly, starting at the outside of the face cam, and moving radially inwardly thereof, we have a series of concentrically arranged in-and-out cams comprising an outer group of nine depressions separated by nine high areas of substantially the same arcuate length as the depressions, then a group of three depressions separated by three high areas having an arcuate length substantially three times that of the depressions, then a group consisting of one depression, and finally a concentric circle in which there are no depressions. This arrangement of cam surfaces provides a multiple in-and-out cam by means of which the skip-rate of the in-and-out movement of the claw can be changed relative to the pull-down stroke to vary the rate by which the film is advanced through the gate by merely moving the ball follower 54 radially of the face cam and into alignment with different ones of said concentric, and circular cam surfaces. In-and-out movement is transmitted to the claw arm 36 from the in-and-out cams by the ball follower 54 which is pressed against the face of the in-and-out cam 64 by the follower end 52 of the claw arm which is loaded in this direction by the action of spring 46 biasing the claw arm 36 into engagement with the film. It will thus be seen that spring 46 in addition to forcing the ball follower into engagement with the in-and-out cam also serves to hold the ball follower in assembled relation. The depressed cam surfaces 70, 70', and 70" are of such depth that when the ball follower drops into one of the same the spring 46 can pivot the claw arm 36 far enough to engage the claw teeth 50 with the film perforations. On the other hand, when the ball follower 54 rides out of a depression and onto the surface of the face cam between depressions the claw arm will be pivoted against the action of spring 46 by a sufficient amount to withdraw the claw teeth from the film path. Accordingly, each circular series of depressed cam surfaces in combination with the face surface of the cam therebetween will constitute a circular in-and-out cam for controlling the movement of the claw teeth 50 to and from the film path of the gate 10. While the innermost circle of the in-and-out cam described has no depression cam surfaces, the face surface of the cam causes the claw to be held out of engagement with the film for the manual projection of "stills" and in reality constitutes an in-and-out cam despite the fact it possesses no depressed cam surfaces. Should it be found desirable to maintain the extent of the in-and-out movement of the claw teeth the same in each position of the ball follower 54 radially of the in-and-out cam 64, then the depth of the depressed cam surfaces of each circular group can be different from those of the other groups to account for the change in the throw of the claw arm occasioned by altering the length of the lever arm as the ball follower 54 is shifted radially of the in-and-out cam relative to the pivot point of the arm as the projection rates are changed.

The reduction ratio between pinion 68 and gear 66 on the face cam 64 is nine to one (9:1). Since there are nine depressed cam surfaces on the outer circular group of the face cam, when the ball follower is positioned radially of the face cam to engage this group it will produce an in-and-out stroke of the claw for each revolution of the up-and-down cam 58. This means that the film F will be pulled down one frame per revolution of the cam 58 or at a rate of 54 frames per second. When the ball follower 54 is moved radially inward of the face cam to engage the next circular group of depressed cam surfaces, or that circle containing three depressed cam surfaces 70' and 70", the claw arm 36 will be moved in and out once for every three revolutions of the up-and-down cam 58 and the film will be advanced at a rate of 18 frames per second. When the follower ball 54 is moved inwardly to the circle containing one cam surface 70" it produces one in-and-out stroke of the claw arm 36 for every nine revolutions of the up-and-down cam 58 and advances the film at a rate of six frames per second.

If the ball follower 54 is moved in on the face cam 64 to a position where there are no depressed cam surfaces there will be no in-and-out movement of the claw and the claw teeth will be held out of engagement with the film by the face surface of the cam. This position of the ball follower will produce a condition for still projection in which the shutter continues to run at 54 frames per second. For all three film speeds described, as well as during still projection, the rate at which the light beam is interrupted by the shutter, and hence the flicker effect, remains constant at 54 interruptions per second. Furthermore, the amount of light transmitted remains constant and independent of the rate of projection.

The ball follower 54 is captured in an aperture 51 in the end of a shift lever 72 which may be adjusted back and forth as indicated by the double end arrow in FIG. 1 to vary the rate of film advance by positioning the ball follower radially of the face cam to selectively engage the different groups of cam surfaces.

The shift lever 72 may be pushed back and forth in the direction of the double arrow shown in FIG. 1 by means of an eccentric pin 73 on a control knob 74 which engages an elongated slot 76 in a turned-over end 78 on the end of the shift lever 72. The control knob 74 can be rotatably mounted on a control panel, not shown, of the projector and a pointer thereon can cooperate with a speed scale calibrated in rates of 54, 18, 6, 0 forward or still; and corresponding frames per second in reverse. The control knob 74 is capable of a movement slightly greater than 180° and in going from one limit of this movement to the other shifts the ball follower 54 from the position where it engages the outermost group of cam surfaces on the face cam (54 frames per second) to its innermost position on the face cam (still projection) and then out again on the cam surface to the 54 frame per second position.

When the shift lever 72 is moved in the direction of the double arrow shown in FIG. 1, the radial position of the ball follower 54 on the in-and-out cam is determined by the radial position of four concentric skip-frame detent grooves 80 in the surface of the face cam 64 into which detent ball 82 is captured in an aperture in the shift lever 72 is forced to drop by a detent spring 84. Thus the radial positions of the ball follower 54 are determined by the detent grooves 80 which are oriented with respect to the in-and-out cam tracks on the face of the in-and-out cam 64.

The variable in-and-out pull-down mechanism described can feed film at rates of 54, 18, 6, or 0 frames per second with substantially instant shift from one rate to another without stopping the up-and-down movement of the film claw. This means that the film is traveling through the projector at 8.1, 2.7, 0.9 or 0 inches per second. With a sprocketless projector of the well known type, e.g. where the film is pulled directly from the film supply reel and fed to the take-up reel by the action of the pull-down claw, this difference in film rate is absorbed easily by the take-up and supply reels which are generally tendency driven.

In order to achieve reverse projection in addition to variable rate pull-down and without having to stop or reverse the direction of the motor or the drive shaft 24, means are provided for re-orienting the up-and-down cam 58 from its original position relative to the in-and-out cam 64. When this is done, the in-and-out cam 64 which normally forces the claws into the film path just prior to the start of the down stroke and withdraws them from the film path at the end of the down stroke, will instead force the claws into the film path just prior to the beginning of the up stroke and withdraw them from the film path at the completion of the up stroke of the claw arm 36.

Referring specifically to FIG. 2 the drive shaft 24, which is always rotatably driven in one direction, is slidably mounted in bearings at 86 and 88. Pull-down cam 58 is fixed to shaft 24 and pinion 68 is rotatably and slidably mounted thereon as described above. When the projector is operating in a forward direction, a driving dog 90 on the pull-down cam 58 drives a forward driving dog 92 on the pinion 68. The pinion 68 in turn drives the in-and-out cam 64 which controls the axial movements of the ball follower 54 as described above. The single bladed shutter is fixed to the pinion 68 and is so timed relative to the forward dog 92 that it covers the gate aperture during the forward indexing stroke of the claw.

A shift lever 94 which pivots about a stationary pivot 96 on the projector is normally biased in a clockwise direction by a spring 98 and has a finger 100 adapted to enage the face of pulley 22. The finger 100 does not contact the face of the pulley 22 when the mechanism is set for forward projection.

To reverse the projector the shift lever 94 is pivoted counterclockwise about its pivot 96 to cause the end of finger 100 to engage the face of pulley 22 and shift the drive shaft 24 axially to the left. In this new position, (not shown), of the drive shaft 24 the driving dog 90 on the pull-down cam 58 slips off the forward driving dog 92 on the pinion 68. As a result pinion 68 slips back precisely 180° until its reverse driving dog 102 comes into engagement with the driving dog 90 on the pull-down cam 58 and continues to operate in this position to effect reverse projection.

In order that the mechanism can only be reversed when the film claw is disengaged from the film, the reverse of the projector is made dependent upon rotation of the control knob 74 as will now be described. The end 104 of shift lever 94 has fixed thereto a follower 106 which is held by spring 98 against the periphery of a cam 108 fixed to the control knob 74 for rotation thereby. The cam 108 includes an arcuate lobe 10 which has a rise which will cause the shift lever 94 to be pivoted counterclockwise to reverse the projector when the lobe is moved into engagement with the follower 106. The lobe 110 is so positioned on the control knob 74 relative to the eccentric pin 73 thereon that it will not engage follower 106 to reverse the projector except when the control knob 74 is in a position to have shifted the ball follower 54 radially of the in-and-out cam to a position where the claw is held out of the film and the film speed is stopped. In other words the projector can be reversed manually only when the rate control knob is in a position to give a "still" projection. The lobe 110 is of such arcuate length that after the control knob is moved counterclockwise from the position shown in FIG. 2 and through the "still" position it will hold the mechanism in the reversed condition while the control knob is rotated further in a counterclockwise direction to produce the full range of rate variations of which the mechanism is possible. Therefore, both the direction and speed of projection will be determined by the setting of the control knob 74 in such a way as to insure that these two operations can occur in only the proper sequence.

The variable rate pull-down system and reversing mechanism thus far described is the same as that disclosed in commonly assigned U.S. Pat. No. 3,261,654 (Faber et al.), and reference is made to said patent for a more specific description of the function and operation of the system.

In accordance with the present invention, means are provided for remotely controlling motion and still projection and forward and reverse operation of the projector. Means are also provided for rendering the projector system responsive to a code program on the film to selectively produce motion and still projection. Means are also provided for remotely focusing the lens system 16 for still and motion projection.

REMOTE CONTROL FORWARD AND REVERSE OPERATION

Remote control over forward and reverse operation is achieved by providing a solenoid 120 to position the shift lever 94 about pivot 96 independently of the knob 74. More specifically, the plunger 121 of the solenoid 120 is connected to lever 94 by a pin 123. Upon energization of the solenoid 120, the plunger 121 will displace the lever 94 to the same extent as cam lobe 110 to effect a transition from forward to reverse in the manner hereinbefore described. Energization of the solenoid 120 is controlled by the control circuit hereinafter described and is synchronized with the position of the film feeding mechanism so that reverse operation can only be effected at a predetermined point in the pull-down cycle of the film feeding mechanism.

REMOTE CONTROL

Motion and still projection

To accomplish selective remote control over still and motion projection, means are provided for rendering the ball follower 54 ineffective to pivot the claw arm 36 in response to a control signal. Referring to FIGS. 1 and 2 and more specifically to FIG. 2, this means comprises an electric solenoid 122 mounted on the projector housing behind the face cam 64 and having a plunger 124, biased to the position shown in FIG. 2 by a spring 126. The solenoid 122 is effective to selectively position a two-position operating lever 128 one end of which is operatively connected to the plunger 124 and biased into engagement with a flange 130 on said plunger by spring 126. The operating lever 128 extends to one side of the face cam 64 and has an arm 132 extending parallel to the plane of the face cam 64 toward the claw arm 36. In the de-energized condition of solenoid 122 (motion projection) the lever 128 and armature pin 124 are biased to the position in FIG. 2. In the energized condition of the solenoid 122 (still projection) the lever 128 is displaced to effect movement of the arm 132 to the position indicated by the dashed lines in FIG. 2.

The upper end of arm 132 is provided with a bent portion 134 which is adapted to engage and restrain the claw arm 36 when the solenoid 122 is energized. As shown in FIG. 2, the claw arm 36 assumes the position shown in solid lines when the follower 54 engages the bottom of one of the depressions 70, 70', and 70", and the position shown in dashed lines when the follower 54 engages the flat surface of face cam 64. In the deenergized condition of solenoid 122 (motion projection) the claw arm 36 can freely move between the two positions indicated to effect in-and-out movement of the claws 50 in the manner hereinbefore described. However, if the solenoid 122 is energized movement of the lever arm 132 will position the bent end portion 134 thereof between the claw arm 36 and face cam 64 as indicated in broken lines in FIG. 2 to prevent movement of the claw arm 36 when one of the depressions 70, 70', 70" is positioned in alignment with ball follower 54. It will be thus apparent that energization of the solenoid 122 in the manner described will immediately disable the claw arm 36 to render the same ineffective to advance film through the gate 10.

In order to obtain a smooth transition from still projection to motion projection and vice versa means are provided for synchronizing energization and de-energization of the solennoid 122 with the position of claw arm 36. This means includes a mechanical commutator system associated with the face cam 64 which functions to establish an energizing circuit for the solenoid 122 only during a range of angular positions of the face cam 64 when the claws 50 are disengaged from the film and the claw arm 36 is in the position indicated by the dashed lines in FIG. 2.

Referring more specifically to FIGS. 2 and 3 of the drawings the mechanical commutator system includes a cam means comprising a plurality of cam lobes 138a (in this case 3) radially spaced on a circle on the surface of the face cam 64 opposite from the surface which includes depressions 70, 71' and 70". A second cam means comprising a single cam lobe 138b is positioned on an outer circle of said surface.

The cam lobes 138a are effective to intermittently close the contacts of an electrical switch means 139 comprising a pair of flexible contact arms 140, 142 having normally open juxtaposed electrical contacts as shown. The contact arms 140, 142 are supported by an insulating block 148 which is mounted on the housing of solenoid 122. The arm 140 is provided with a cam engaging pin 150 adapted to be engaged by the lobes 138a to close the switch contacts three times during each revolution of the cam 64. The cam lobes 138a and contact arms 140 and 142 are positioned relative to the depressions 70, 70', and 70" in the rear surface of the face cam 64 to effect closing of the contacts therein only during a predetermined portion of the pull-down cycle of claw arm 36 to prevent energization of the solenoid 122 when the claws 50 are in engagement with the film as will later be described in more detail.

The cam lobe 138b is effective to intermittently open the contacts of a second switch means 151 comprising a pair of flexible switch arms 152 and 154 supported by the insulating block 148 and provided with a pair of normally closed juxtaposed electrical contacts as shown. The switch arm 152 is provided with cam engaging pin 160 adapted to be engaged by the cam lobe 138b to effect momentary opening of the switch contacts to control energization of a holding circuit for solenoid 122 as will later be described in more detail.

The cam lobes 138a and 138b may be positioned on the face surface of the cam 64 in the positions indicated relative to the cam lobes 70, 70', and 70" and have the relative length dimensions shown. The exact positions and lengths of the lobes 138a and 138b are dependent on the time constants of various elements in the projector system.

A third switch means 162 comprising a pair of normally open contacts 168 and 170 are supported in an insulating block 172 adjacent the operating lever 128 to be responsive to the position thereof. The contacts 168 and 170 are biased to an open position by a spring not shown and are adapted to be separated by the axial movement of a pin 174, the end of which is positioned in engagement with lever 128. When the lever 128 is displaced in response to energization of solenoid 122, the pin 174 will be displaced axially to close contacts 168 and 170.

Motion and still focusing

To provide for remote control over motion and still focusing, the lens system represented by housing 16 preferably takes the form of that disclosed and claimed in copending application Ser. No. 590,066 filed concurrently herewith by Robert J. Roman et al., now abandoned. As described in said copending application the position of the optical system may be selectively positioned between predetermined motion and still focus positions by the displacement of an actuating lever 180. Preferably, lever 180 is positioned in the projector system herein disclosed in response to energization of solenoid 122 to effect adjustment of the optical system to a still focus condition. To this end a lever 182 is pivoted on a bracket 184 and has one end engaging a notch in the lever arm 132 and the other end thereof operatively connected to one end of an elongated lever 186, the other end of the lever 186 being operatively connected to lever 180. It will be apparent that when the actuating lever 128 is displaced in response to energization of solenoid 122, lever 182 will be pivoted counterclockwise to position lever 186 and effect displacement of lever 180 to adjust the lens system in housing 16 for a still focus condition. Upon de-energization of solenoid 122 the parts will be actuated in the opposite direction to return the optical system to the motion focus position. Reference is made to the copending application Ser. No. 590,066 for a complete description of the structure and operation of the lens system 16.

FILM CODING AND DETECTION

In accordance with one feature of the invention, still projection of selected frames of the filmstrip may be selectively programmed by the position of code marks on the film. The control circuit which will later be described is responsive to the presence of the code marks to automatically effect still and motion projection in accordance with the code format.

Figure 4:
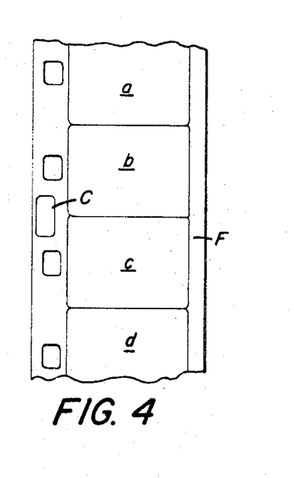
FIG. 4 is a detail of a portion of a filmstrip to be used with the projector mechanism shown in FIGS. 1 and 2.

Referring to FIG. 4 of the drawings, film F is illustrated in detail as comprising consecutive picture frames a, b, c, d, etc., each having a sprocket hole in the film border on the frame centerline. The film F may be coded in accordance with the present invention by providing code marks on the film border between the sprocket holes. Preferably, the code spot C on the film is detected by the means now to be described to effect a shift of the projector system from motion to still projection as will later be described in connection with the operation of the control circuit.

Preferably, a code spot C is located on the film one and one-half frames in advance of a frame to be projected in still.

The code spot C depicted in FIG. 4 is located to effect still projection of frame a. As will be apparent to those skilled in the art various other spacings are possible and the disclosed arrangement of code marks is merely in accordance with one preferred embodiment of the invention.

The preferred embodiment of the invention is intended for use with a film F having a non-transparent border.

A code mark C may be formed by exposing the film in the area of the mark so that a transparent spot will appear upon film development. Alternatively a code mark can be edited onto the film by hand after development by scraping the emulsion off the film base in the desired location. Code marks formed by either method can be edited out by covering the transparent spot with opaque ink. It will also be apparent that the film border could be transparent and the code spot could comprise non-transparent spots on the border.

Figure 5:
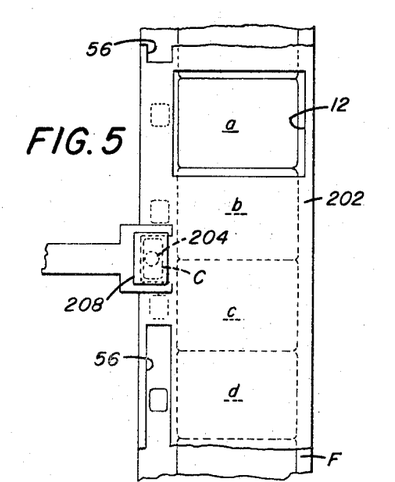
FIG. 5 is an enlarged front view of the film gate shown in FIGS. 1 and 2.
Figure 6:
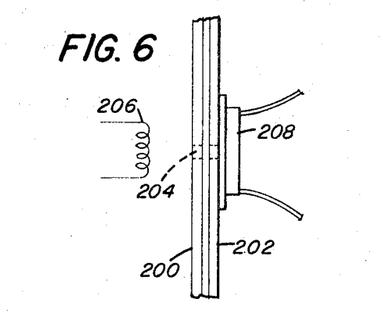
FIG. 6 is an enlarged side view of the film gate and light sensing means shown in FIGS. 1 and 2.

Code marks C can be selectively positioned on the film F in the manner described above to be detected by a code detecting means associated with the film gate 10. Referring to FIGS. 1, 5 and 6 of the drawings the gate 10 comprises an aperture support plate 200 and a film pressure plate 202 between which the film is advanced by operation of the film advancing mechanism hereinbefore described to effect illumination of the film frames by lamp 14 in the manner well known to those skilled in the art.

The aperture support plate 200 and pressure plate 202 are provided with aligned openings defining a code mark aperture 204 in the gate 10 located near the edge of the gate 10 and spaced from the frame aperture 12 by a distance equal to one and one-half film frames. The arrangement is such that code mark C on the film F will be aligned with the aperture 204 when the frame a is aligned with frame aperture 12 to produce an electrical signal.

To detect the code mark a lamp 206 is positioned in alignment with aperture 204 and a photo electric cell 208 is mounted on or adjacent to the pressure pad 202 over the code aperture 204 by means of a suitable bracket. In the absence of a code mark C nontransparency of the film margin prevents illumination of the photo cell by the lamp 206. However, when a code mark C becomes aligned with the code aperture 204 the cell 208 will be illuminated by passage of light through the transparent area forming the code mark to produce an electrical output signal. The control circuit later to be described is responsive to the output of the photo cell 208 during alignment of a code mark C with the aperture 204 to effect still projection of the frame then aligned with the projector aperture 12.

CONTROL CIRCUIT

Figures 7, 8A, 8B, 8C, 8D:
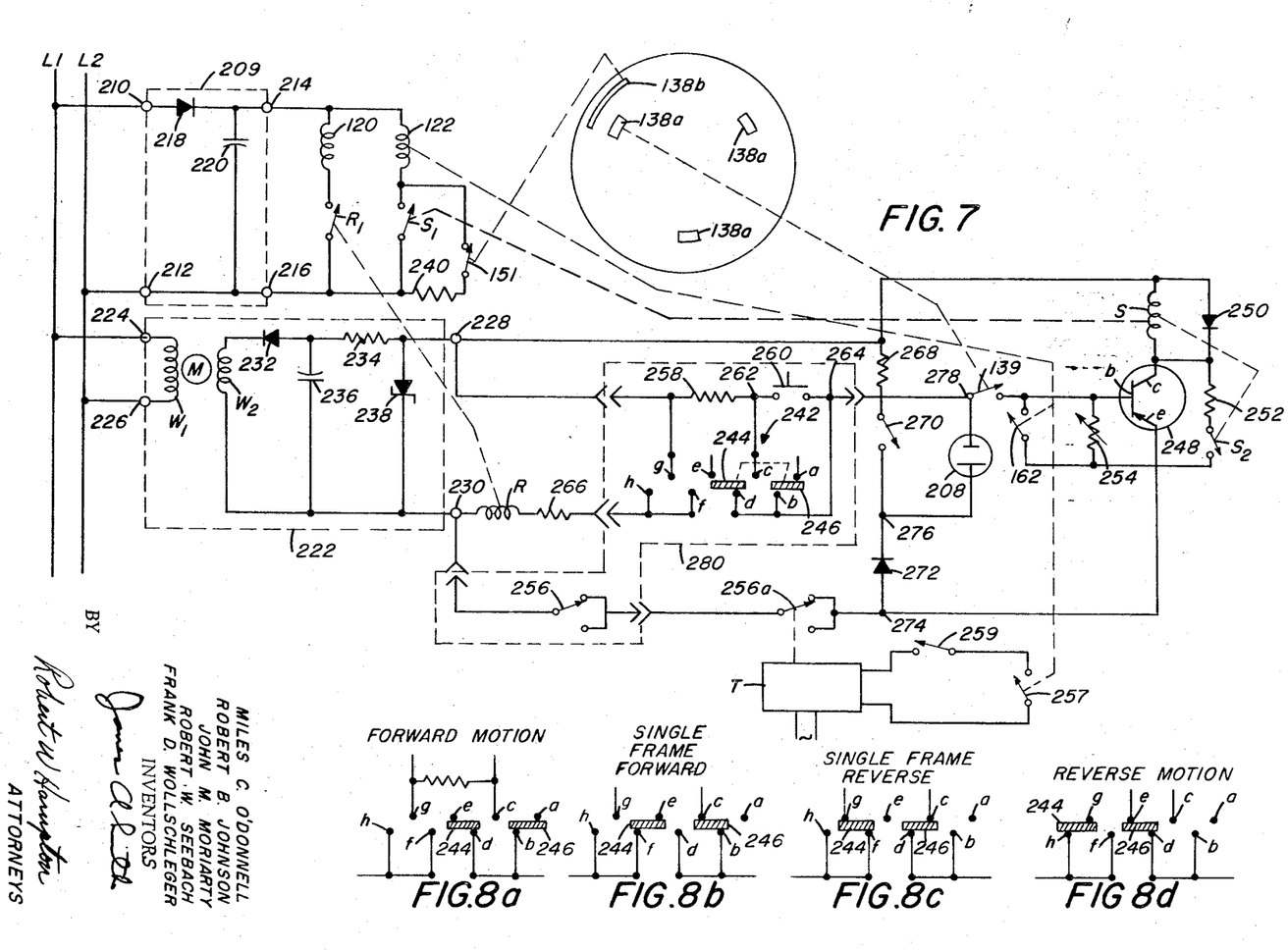
FIG. 7 is a schematic diagram of the control circuit for controlling operation of the projector system.
FIGS. 8a, 8b, 8c and 8d are views illustrating different control positions of the control switch depicted in FIG. 7.

Referring to FIG. 7 of the drawings there is shown a control circuit in accordance with the invention for selectively controlling energization of the solenoids 120, and 122 to effect selective remote control over forward and reverse projection, and still and motion projection. The circuit is also responsive to an output from photocell 208 during motion projection to effect still projection of selected frames in accordance with a code program on the film. The control circuit includes a direct voltage power supply 209 having input terminals 210 and 212 connected to a source of alternating line voltage comprising conductors $L_1$ and $L_2$, and having a pair of direct voltage output terminals 214 and 216. The power supply 209 in the disclosed embodiment includes a diode rectifier element 218 connected in series between the input terminal 210 and output terminal 214 and a filter capacitor 220 connected across the output terminals 214 and 216. The rectifier 218 and capacitor 220 are effective to produce relatively smooth half wave rectification of the alternating line voltage in a manner well known to those skilled in the art and further description is deemed to be unnecessary.

The circuit of FIG. 7 also includes a low voltage power supply 222 having input terminals 224 and 226 coupled to the line voltage conductors $L_1$ and $L_2$, and output terminals 228 and 230 across which a relatively low voltage output signal is developed. In the disclosed embodiment the power supply 222 takes the form of a motor-former power supply established by providing the alternating current projector drive motor M with an output winding $W_2$ inductively coupled to the motor input winding $W_1$ as diagrammatically indicated in FIG. 7. The lower end of winding $W_2$ is electrically connected to output terminal 230 while a diode rectifier 232 and resistance 234 are connected in series between the upper end of winding $W_2$ and output terminal 228. A capacitor 236 is electrically connected between the lower end of winding $W_2$ and the common junction of rectifier element 232 and resistance 234. A Zener diode 238 is shunted across the output terminals 228 and 230 to produce a regulated voltage output. The motor-former power supply 222 is also of a form well known to those skilled in the art and a specific description of the operation thereof is deemed to be unnecessary. In the case of the circuit embodiment disclosed in FIG. 7 the power supply 222 functions to produce a regulated potential of −18 volts at terminal 228 with respect to terminal 230.

The power supply 209 comprises an energizing voltage source for reverse solenoid 120 and stop solenoid 122. More specifically, the reverse solenoid 120 is connected in series with the normally open switch contacts $R_1$ of a reversing relay R across the output terminals 214 and 216 of power supply 209. The stop solenoid 122 is connected in a parallel circuit in series with the normally open switch contacts $S_1$ of a stop relay S. The normally closed cam operated switch 151 previously described is connected in series with a current limiting resistance 240 in a circuit shunting the relay contacts $S_1$ to establish a holding circuit for relay $S_1$ which is periodically broken for a purpose which will later be described in more detail.

The circuitry coupled to the output terminals of power supply 222 includes a mode selector switch 242 which comprises a plurality (in this case 8 fixed contacts) a, b, c, d, e, f, g, and h adapted to be selectively engaged by a pair of sliding contacts 244 and 246 which are mechanically coupled as indicated to be positioned as a unit relative to said fixed contacts. The sliding contacts 244 and 246 have four control positions relative to contacts a, b, c, d, e, f, g, and h which are diagrammatically indicated in FIGS. 8a, 8b, 8c, and 8d for effecting forward motion, forward single frame, reverse single frame and reverse motion modes of projection respectively.

The mode switch 242 and the switch means which will later be described controls the state of conductivity of a transistor 248 having a base electrode b, a collector electrode c and an emitter electrode e. The stop relay S is connected between the collector electrode and output terminal 228 of power supply 222 and is shunted by a diode rectifier 250. The normally open switch contacts $S_2$ of relay S are connected in series with a resistance 252 between the collector and emitter electrode to define a shunt holding circuit for relay S.

Circuit bias for transistor 248 is provided by a variable resistance 254 connected between the base and emitter electrodes. The normally open switch 162 is connected in parallel with the resistance 254 and is operative when closed to short the emitter and base electrodes to render the transistor nonconductive as will be described in more detail below.

To complete the transistor circuit the emitter electrode

*e* is electrically connected through a manually operative reset switch 256 to the positive power supply terminal 230. The switch 256 has a movable contact electrically connected to terminal 230 and movable between a pair of fixed contacts connected to emitter *e* of transistor 248. The contact arm may be displaced between the fixed contacts to momentarily break the holding circuit for the stop relay as will hereinafter be described in more detail. Such momentary break switches are well known in the art and a more specific disclosure is deemed to be unnecessary.

As will later be described, the switch 256 is manually actuated to effect advancement of frames during the still mode of projection. Alternatively, such frame advancement may be effected on a time basis through the provision of a second reset switch 256a arranged to be mechanically actuated by a control means which may comprise an electrically operative automatic reset timer T. The reset circuit of timer T may be activated by a normally open switch 257 mechanically coupled to switch 162 to be actuated to a closed position in response to energization of stop solenoid 122. The switch 257 may be connected in series with a manually operative switch 259 in the reset circuit for timer T as diagrammatically indicated in FIG. 7. When switch 259 is closed, closing of switch 257 in response to energization of stop solenoid 122 will activate or reset timer T which in turn will actuate switch 256a at the end of a time delay to momentarily break the holding circuit for relay S to effect advancement of a film frame or transfer the system from still to motion projection as will hereinafter be described in more detail in connection with operation of the overall system. The timing feature may be eliminated by opening switch 259 to prevent energization of time T by switch 257.

Referring now to the specific circuitry for controlling conductivity of transistor 258, a resistance 258, a normally open manually operative push-button switch 260 and the switch 139 (operated by cam lobes 138a) are connected in series in the recited order between the power supply terminal 228 and the base electrode of transistor 248. The voltage drop across resistance 258 establishes a negative potential at terminal 262 effective to bias the transistor 248 conductive when terminal 262 is connected to the base electrode by the switches 260 and 139.

The mode switch 242 is effective to establish a shunt circuit around switch 260 during single frame operation. More specifically, terminal 262 is electrically connected to contact *c* of mode switch 242. Contacts *b* and *d* of mode switch 242 are electrically interconnected and connected to terminal 264 between pushbutton switch 260 and switch 139. With this arrangement when the slider contact 246 electrically connected contacts *c* and *b* contacts *c* and *d* of switch 242, a shunt circuit will be established around switch 260 between terminals 262 and 264.

The mode switch 242 is also arranged to control forward and reverse operation of the film feed mechanism. To this end the power supply output terminal 228 is electrically connected to contact *g* of switch 242. Contacts *f* and *h* of switch 242 are electrically interconnected and connected in series with a resistance 266, reversing relay R and power supply terminal 230 to provide an energizing circuit for reversing relay R. Electrical connection of contacts *g* and *f* or contacts *g* and *h* by slider contact 244 will connect relay R and resistance 266 in series across the power supply output terminals to energize relay R which in turn will close contacts $R_1$, to energize reversing solenoid 120.

The photocell 208 and the associated circuit now to be described also comprises a means for controlling conductivity of transistor 248. More specifically a resistance 268, normally open manually operative switch 270 and a diode rectifier 272 are connected in series between the terminal 228 of power supply 222 and terminal 274 in the emitter circuit of transistor 248. The photocell 208 is connected between a terminal 276 forming the common junction of switch 270 and rectifier 272, and terminal 278 in the base electrode circuit. When the photocell 208 is illuminated as hereinbefore described during the presence of a code mark in the code mark aperture it will become conductive and a potential will appear at terminal 278 equal to the potential at terminal 276 plus the voltage across photocell 208. If switch 139 is closed the potential produced at terminal 278 in response to illumination of photocell 208 will bias the transistor 248 conductive.

Diode rectifier 272 serves to regulate the potential at terminal 276 to compensate for variations in emitter base voltage of transistor 248. Switch 270 comprises a means for rendering the photocell ineffective to bias the transistor 248 conductive when response to code marks during motion projection is not desired. Opening of switch 270 serves to disconnect terminal 276 from the power supply terminal 228 and thus open circuit the photocell 208.

By means of the circuit described transistor 248 can be selectively rendered conductive and nonconductive to control energization of stop relay S and motion and still operation of the projector system. Switch 139 is placed in series with the base electrode of transistor 248 so that a signal can only be applied to the base electrode of transistor 248 in a predetermined portion of the pulldown cycle of claw arm 52 as will presently be described in more detail. When the transistor 248 is biased conductive a circuit will be completed from power supply terminal 228 through relay S, transistor 248, switch 256 to power supply terminal 230 to thus effect energization of relay S. The switch contacts $S_2$ will close upon energization of relay S to complete a holding circuit for relay S through resistor 252. Switch contacts $S_1$ will close upon energization of relay S to energize stop solenoid 122 which positions the lever 128 to disable the claw arm 36 in the manner hereinbefore described. Initial displacement of lever 128 in response to energization of stop solenoid 122 will close switch 162 which functions to short the base and emitter electrodes of transistor 248 together to render transistor 248 nonconductive. The stop relay S will remain energized through the holding circuit established by relay contacts $S_2$ and stop solenoid 122 will remain energized through the energizing circuit established by relay contacts $S_1$. This sequence of operation following the application of a bias potential to the base electrode of transistor 248 thus transfers the system from a motion mode of projection to a still mode of projection.

The system may be transferred back to motion projection, by manual actuation of switch 256 to momentarily break the holding circuit for stop relay S. De-energization of relay S will occur to effect opening the contacts $S_2$ in the holding circuit for stop relay S and contacts $S_1$ in the energizing circuit for stop solenoid 122.

Deenergization of stop solenoid 122 subsequent to deenergization of stop relay S is controlled by the normally closed switch 151 which is opened once during each revolution of the face cam 64 by cam lobe 138b as hereinbefore described. More specifically switch 151 when closed connects the stop solenoid 122 in series with resistance 240 across the power supply output terminals 214 and 216. Due to the voltage drop across resistance 240 this circuit does not develop sufficient voltage across stop solenoid 122 to initially pick up the solenoid armature. The voltage developed across solenoid 122 is sufficient, however, to hold the solenoid armature once it has been completely displaced. Accordingly, after opening of relay switch contacts $S_1$ to stop solenoid 122 will remain energized until switch 151 is opened by cam 138b which is positioned to open switch 151 only in a predetermined portion of the pull-down cycle of claw arm 52 as will now be described.

Considering now the specific operation of the switches 139 and 151 and the synchronizing of the same with operations of the claw arm 36 in FIG. 9 of the drawings we have shown schematically a cycle of operation of the claw arm 36 when the ball follower 54 is positioned to engage the depressions 70' to produce a film speed of 18 frames per second which is the preferred maximum speed of the projector system during remote control operation. In the disclosed embodiment, the cam lobes 138a are of sufficient length and positioned relative to the cam depressions whereby during each cycle of the claw arm 36, switch 139 will be closed between points 1 and 2 as indicated. The arrangement is such that switch 139 closes an instant after the claw teeth 50 are extracted from the film and remains closed during nearly half of the following skip stroke during which primarily upward movement of the claw arm 36 occurs. Accordingly, the transistor 248 can only be energized between points 1 and 2 of the pull-down cycle at 18 frames per second. The provision of three cam lobes 138a permits the transistor 248 to be energized during points 1 and 2 of each of the three pull-down cycles during a complete revolution of the face cam 64.

The single cam lobe 138b is positioned relative to the adjacent cam depressions on the face cam 64 and is of sufficient length to open switch 151 between points 1 and 3 of the pull-down cycle. In the disclosed embodiment, point 3 is spaced from point 2 in time so to provide an open time sufficient to insure drop out of solenoid 122 when relay S is de-energized.

The operation of the transistor 248, stop relay S, solenoid 122 and switches 139 and 151 described above is the same during the various modes of operation now to be described which differ mainly in the method and circuitry for rendering transistor 248 conductive and nonconductive.

Referring now to the various operational modes of the system when the switch 242 is in the position shown in FIG. 7, and depicted in detail in FIG. 8a, the system is set for automatic forward motion projection, the transistor 248 being biased nonconductive by the basic circuit configuration thereof. At any time during motion projection the system can be manually transferred to still projection by momentarily closing switch 260 to apply a bias voltage to base electrode (b) of transistor 248. Closing of switch 260 will complete a circuit from power supply terminal 228 through resistance 258, switch 260 and switch 139 (when closed) to the base electrode of transistor 248 to render the transistor 248 conductive. Stop relay S and solenoid 122 will accordingly be energized in the manner described above to effect still projection. Once energized stop relay S will remain energized until switch 256 is manually actuated to break the holding circuit for stop relay S. Stop solenoid 122 will be subsequently de-energized when cam 138b momentarily opens switch 151.

When set for forward motion projection, the system will also automatically transfer to still projection when the photocell 208 detects a code mark on the film in the manner hereinbefore described. More particularly, when the photocell 208 is illuminated in response to the presence of a code mark in aperture 204 a circuit will be completed from terminal 228 through resistance 268, switch 270, photocell 208, and switch 139 (when closed) to the base electrode of transistor 248. As described above switch 139 closes once for each frame pulled down at a film speed of 18 frames per second and will determine the instant at which the transistor 248 is rendered conductive when a code mark is detected. The projection system will thus be transferred to still projection in the manner described in response to a code mark on the film and will remain in a still projection mode of operation until switch 256 is actuated to de-energize stop relay S in the manner hereinbefore described.

The response of the projection system to code marks on the film can be omitted by opening switch 270 to disconnect terminal 276 from the power supply.

A timed showing of stills during forward motion projection can be accomplished by closing switch 259 to render timer T and its associated circuitry operative in the system. For example, if switch 260 is closed to effect still projection of a selected frame switch 257 when closed in response to energization of stop relay 122 will complete the timer reset circuit. After a predetermined time delay, timer T will actuate switch 256a to break the holding circuit for stop relay S whereupon the system will return to motion projection.

When the switch 259 is closed, the timer T will be similarly effective to produce timed still projection of coded frames. In this case, the system will be returned to motion projection after still projection of a coded frame for a predetermined time. It will be apparent that if a series of frames are coded for still projection, the timer T will render the system effective to automatically advance the series frame by frame on a time basis and return the system to motion projection at the end of the series.

In FIG. 8b of the drawings, the position of the switch 242 is such as to produce a single frame forward mode of operation. More specifically, the sliding contacts 244 and 246 are displaced one position to the left from the position shown in FIG. 8a so that slider contact 244 electrically connects contacts e and f and slider contact 246 electrically connects contacts c and b. The new position of slider contact 244 does not produce any change in the circuit since contact e has no circuit connection. However, the new position of slider contact 246 completes a circuit from terminal 228 through resistance 258, contacts c and b of switch 242 and switch 139 (when closed) to base electrode b of the transistor 248 to bias the latter conductive. The switch 242 in the position shown in FIG. 8b accordingly establishes a shunt circuit around normally open switch 260 to establish a bias circuit for the base electrode b of transistor 248.

With the switch 242 in the position shown in FIG. 8b the transistor 248 will be rendered conductive when switch 139 is engaged by the next cam lobe 138a to energize stop relay S and stop solenoid 122 in the manner hereinbefore described. Switch 162 will close to short the emitter base circuit of transistor 248 in the manner previously described to render the transistor 248 nonconductive, the relay S being held in by the holding circuit established by contacts S₁. The system will accordingly be transferred to still projection. The filmstrip may then be advanced to the next frame by manual actuation of switch 256 to break the holding circuit for relay S and effect de-energization of stop solenoid 122 in the manner previously described. Once solenoid 122 is de-energized switch 162 will open to eliminate the shorted conditions of the base and emitters electrodes. The circuit established by switch 242 will then bias the transistor 254 conductive to effect re-energization of stop relay S and stop solenoid 122. The time lapse between de-energization of solenoid 122 by operation of cam 138b and re-energization of relay S subsequent to opening of switch 162 is sufficient to permit one pull-down cycle of claw arm 36. It will be thus apparent that the filmstrip may be advanced frame by frame through the gate 10 by manual actuation of switch 256.

During manual single frame operation automatic frame advancement on a time basis can be achieved by closing switch 259 to render the timer T operative. When switch 257 closes in response to energization of solenoid 122 the reset circuit of timer T will be completed and after a predetermined time delay timer T will actuate switch 256a to break the holding circuit for relay S to effect advancement of the next frame whereupon the cycle will be automatically repeated.

If the switch 242 is displaced to the position shown in FIG. 8c of the drawings, the system will function in a single frame reverse mode of operation. More specifically, referring to FIG. 8c slider contact 246 electrically connects contacts c and d of switch 242 to establish a bias circuit for the base electrode b of transistor 248 from terminal 228 through resistance 258, contacts c and d of switch 242 and switch 139 (when closed) to base electrode b to transistor 248 to establish a bias circuit shunting switch 260. The bias circuit for transistor 248 thus will be similar to the bias circuit established during the forward single frame mode of operation described above.

The slider contact 244 of switch 242 electrically connects contacts g and f during reverse single frame operation as indicated in FIG. 8c to complete a circuit from terminal 228 through contacts g and f of switch 242, resistance 266 and reversing relay R to terminal 230. Energization of reversing relay R will close normally open relay contacts $R_1$ to effect energization of reversing solenoid 120 and reverse operation of the projector system in the manner previously described. The system will function in the same manner as during single frame forward operation except that actuation of switch 256 or switch 256a will effect single frame advance of the filmstrip in the reverse direction. Frame by frame advancement on a time basis can be accomplished during reverse by closing switch 259 to render timer T operative in the manner hereinbefore described.

Operation of the projector system in a reverse motion mode of projection can be achieved in the position of switch 242 depicted in FIG. 8d of the drawings. In this position slider contact 246 of switch 242 electrically connects contacts e and d and contact 244 electrically connects contacts g and h. The reverse relay R is thus energized by a circuit completed from terminal 228 through contacts g and h of switch 242, resistance 266 and reverse relay R to terminal 230 of power supply 222. Reverse operation of the film advancing mechanism will thus occur. Similar to the forward motion mode previously described, the transistor 248 is normally biased nonconductive. However, switch 260 can be manually actuated in the manner described in connection with the forward motion mode to effect still projection.

During the reverse motion mode of operation the control circuit can function to produce still projection of coded frames int he same manner as described in connection with the forward motion mode of operation. The timer T may also be rendered operative to effect projection of stills on a time basis.

The circuit components enclosed by the dashed perimeter 280 in FIG. 7 may be located in a suitable control box which can be held by the operator ot facilitate operation of the system. A suitable extension cable containing the electrical connections can be provided to impart limited portability to such a control box relative to the projection system.

It will be apparent that control circuit shown in FIG. 7 provides a selective remote control over various modes of motion and still and forward and reverse projection in addition to the mechanical control of such functions which can be effected by selective positioning of cam follower 54 in the manner previously described. The remote control system can be utilized at any one of the forward or reverse projector speed (54, 18 and 6 frames per second) which can be selected by positioning of knob 76. Due to the fast response time required with a speed of 54 cycles per second operation at 18 or 6 frames per second is preferred.

While one or more preferred embodiments of the invention have been herein shown and described, it will be apparent to those skilled in the art that many modifications of the structure and arrangement of parts disclosed may be made within the scope of the invention as defined in the appended claims.

It is claimed and desired to be secured by Letters Patent of the United States:

1. In a projector system for projecting image frames contained on a film having code marks corresponding to selected frames to be still projected, the combination comprising:

a film gate having a projection aperture;
means for advancing the film through said gate to successively position the image frames in alignment with said aperture to effect motion projection of the film;
means for disabling said film advancing means to effect still projection of an image frame; and
means including a code responsive switch and a cyclically operable switch responsive, respectively, to said code marks and to the position of said film advancing means for actuating said disabling means in response to a code mark only when said film advancing means is in a predetermined range of positions, whereby to effect still projection of the frames corresponding to said code marks.

2. In a projector system for projecting image frames contained on a film, the combination comprising:

a film gate having a projection aperture;
means for advancing the film through said gate to successively position the image frames in alignment with said aperture to effect motion projection of the film;
means for disabling said film advancing means to effect still projection of an image frame;
code marks on the film corresponding to frames to be still projected;
means responsive to said code marks for actuating said disabling means to effect still projection of the frames corresponding to said code marks; and
overriding means comprising a cyclically operable switch responsive to the position of said film advancing means for preventing said actuation except when said film advancing means is in a predetermined range of positions.

3. In a projector system for projecting image frames contained on a film having code marks corresponding to frames to be still pojected, the combination compising:

a film gate having a projection aperture;
a film claw;
means for moving said claw in-and-out and up-and-down relative to said gate to intermittently engage and advance the film through said gate to effect motion projection of the film;
code detecting means associated with said gate for producing an electrical signal when a code mark corresponding to a frame to be still projected is detected;
means responsive to said electrical signal for rendering said claw ineffective to engage and advance the film through said gate to effect still projection of a frame corresponding to a code mark detected; and
means responsive to the position of said claw for passing said signal to said signal responsive means only when said claw is in a predetermined range of positions.

4. In a projector system as claimed in claim 3 wherein said means for rendering said claw ineffective includes a member movable into engagement with said claw to prevent engagement of said claw with the film during continued up-and-down movement thereof, and an electric solenoid for positioning said member in engagement with said claw.

5. In a projector system as claimed in claim 4 wherein said means responsive to the position of said claw comprises means for synchronizing energization of said solenoid with the position of said claw whereby said solenoid can only be energized to position said lever in engagement with said claw when said claw is out of engagement with the filmstrip, regardless of the time of occurrence of said electrical signal.

6. In a projection system for projecting image frames contained on a film, the combination comprising:

a film gate having a projection aperture;
means for advancing the film through said gate to successively position the image frames in alignment with said aperture to effect motion projection of the film;

a lens system positioned adjacent said projection aperture;

an actuating member for said lens system having a first position for focusing said lens system for motion projection and a second position for focusing said lens system for still projection;

and means for disabling said film advancing means to effect still projection of an image frame and for automatically positioning said actuating member from said first to said second position upon disabling said film advancing means.

7. In a projector system as claimed in claim 6 wherein said last-recited means comprises a movable member engageable with said film advancing means and said actuating member.

8. In a projector system as claimed in claim 7 wherein said movable member is electrically operative to move in response to an electric signal.

9. In a projector system for projecting image frames contained on a film having code marks corresponding to particular frames to be still projected, the combination comprising:

a film gate having a projection aperture;

means for advancing the film through said gate to successively position the image frames in alignment with said aperture to effect motion projection of the film;

a lens system positioned adjacent said aperture for projecting frames aligned with said aperture, said lens system having a motion focus condition and a still focus condition;

an actuating member for said lens system having a first position for effecting said motion focus condition thereof and a second position for effecting said still focus condition thereof; and means responsive to the code marks for disabling said film advancing means to effect still projection of the frames corresponding to the code marks and for moving said actuating member from said first position to said second position thereof.

10. In a projector system for projecting image frames contained on a film, the combination comprising:

a film gate having a projection aperture;

means for advancing the film through said gate to successively position the image frames in alignment with said aperture to effect motion projection of the film;

electrically operative means having an operative condition for rendering said film advancing means ineffective to advance the film to effect still projection of an image frame, and an inoperative condition;

an electronic switch having conductive and nonconductive states for rendering said electrically operative means operative and inoperative respectively;

means for selectively biasing said electronic switch conductive and nonconductive to selectively produce motion and still projection of the film; and means including a cyclically operable switch responsive to the position of said film advancing means for preventing said selective biassing except during predetermined positions of said film advancing means.

11. In a projector system for projecting image frames contained on a film, the combination comprising:

a film gate having a projection aperture;

a claw member;

means for moving said claw member in-and-out and up-and-down relative to said gate to intermittently engage and advance the film through said gate to successively position the image frames in alignment with said aperture to effect motion projection of the film;

electrically operative means operative when energized to render said claw member ineffective to engage and advance the film to effect still projection of selected image frames;

a transistor having base, emitter, and collector electrodes, and conductive and nonconductive states;

first circuit means coupled to said emitter and collector electrodes to energize said electrically operative means when said transistor is conductive;

second circuit means adapted to be connected to said base electrode for selectively rendering said transistor conductive and nonconductive;

switch means having a closed position for connecting said second circuit means to said base electrode and an open position for disconnecting said second circuit means from said base electrode; and means responsive to the position of said claw member for cyclically opening and closing said switch means in accordance with the position of said claw member to prevent energization of said electrically operative means when said claw member is in engagement with the film.

12. In a projector system for projecting image frames contained on a film, the combination comprising:

a film gate having a projection aperture;

a film claw member;

means for actuating said claw member through an in-and-out and up-and-down pull-down cycle relative to said gate to cause said claw member to intermittently engage and advance the film through said gate;

a claw disabling member adapted to be displaced from a first position to a second position to engage said claw member and render the same ineffective to engage the film;

an electric solenoid operative when energized to displace said claw disabling member from said first position to said second position;

first circuit means for connecting said solenoid to a first voltage source;

an electric relay having a first pair of switch contacts associated with said first circuit means to effect energization of said solenoid in response to energization of said relay;

a transistor having base, emitter, and collector electrodes;

second circuit means connecting said collector electrode and said relay in series with one side of a second voltage source and connecting said emitter electrode to the other side of the second voltage source to effect energization of said relay when said transistor is conductive; and third circuit means connected between said base electrode and the second voltage source for applying a bias potential to said base electrode to render said transistor conductive.

13. In a projector system as claimed in claim 12 wherein:

said relay has a second pair of switch contacts connected across said emitter and collector electrodes of said transistor and operative to close upon energization of said relay to establish a holding circuit for said relay;

said second circuit means includes normally closed switch means connected between said emitter electrode and the other side of the second voltage source adapted to be opened to break said holding circuit to de-energize said relay;

said third circuit means includes normally open switch means electrically connected between said base and emitter electrodes and movable to a closed position to short circuit said base and emitter electrodes to render said transistor nonconductive; and further including:

means operatively connected to said claw disabling member for actuating the last said switch means to said closed position thereof in response to movement of said claw disabling member from said first position to said second position.

14. In a projector system as claimed in claim 13 wherein said switch means connected between said emitter electrode and the other side of said second power source comprises a normally closed momentary break switch.

15. In a projector system as claimed in claim 14 further including:
an electric reset timer coupled to said momentary break switch; and
fourth circuit means for resetting said timer including switch means having open and closed positions operatively connected to said claw disabling member to be actuated to a closed position to reset said timer in response to displacement of said claw disabling member from said first position to said second position, said timer being operative at the end of a predetermined time delay after reset to actuate said momentary break switch.

16. In a projector system as claimed in claim 13 wherein said third circuit means includes first synchronizing switch means having open and closed positions connected directly in series with said base electrode; and further including means for intermittently opening and closing said first synchronizing switch means in synchronism with the pull-down cycle of said claw member to prevent the application of a bias potential to said base electrode when said claw member is in engagement with the film.

17. In a projector system as claimed in claim 16 wherein said first circuit means includes a holding circuit for said solenoid for maintaining energization thereof independently of said first switch contacts of said relay, and a second synchronizing switch means associated with said solenoid holding circuit having open and closed positions; and further including means for intermittently opening and closing said second synchronizing switch means in synchronism with the normal movement of said claw member to prevent de-energization of said solenoid during the film engaging portion of the cycle of operation of said claw member.

18. In a projector system as claimed in claim 17 wherein said third circuit means further includes a resistance and a normally open manually operative switch connected in series between said first synchronizing switch means and the one side of the second voltage source, said manually operative switch being operable in a closed position to apply a bias voltage to said base electrode.

19. In a projector system as claimed in claim 18 further including reversing means movable from a first to a second position to render said claw member effective to advance the film through said gate in a reverse direction;
a reversing solenoid operatively connected to said reversing means and operative when energized to displace said reversing means from said first to said second position;
fifth circuit means for connecting said reversing solenoid to the first voltage source;
a reversing relay having switch contacts associated with said fifth circuit means to effect energization of said reversing solenoid in response to energization of said reversing relay;
a mode switch for selectively establishing motion and still modes of projection in reverse and forward directions of film advance; said mode switch having a forward motion position wherein said transistor is selectively biased conductive by manual operation of said manually operative switch, a forward single frame position for electrically establishing a short circuit around said manually operative switch to normally establish a bias circuit for said base electrode, a reverse single frame position for electrically connecting said reversing relay across the second voltage source and to electrically establish a short circuit around said manually operative switch, and a reverse motion position for electrically connecting said reversing relay across the second voltage source and wherein said transistor is selectively biased conductive by manual operation of said manually operative switch.

20. In a projector system as claimed in claim 19 further including code marks on the film corresponding to frames to be still projected;
means responsive to said code marks for generating an electric signal when a frame to be still projected is positioned in said projection aperture; and
sixth circuit means for electrically connecting said code mark responsive means and said synchronizing switch means in a series circuit between said base electrode and said one terminal of the second voltage source whereby the signal generated by said code mark responsive means is effective to bias said transistor conductive in the closed position of said synchronizing switch means.

21. In a projector system for projecting image frames contained on a film, the combination comprising:
a film gate having a projection aperture;
means operative to advance the film through said gate in a forward direction to successively position the image frames in alignment with said aperture to effect forward motion projection of the film;
electrically operative means for modifying operation of said film advancing means to render the same operative to advance the film through said gate in a reverse direction to effect reverse motion projection of the film;
electrically operative means for rendering said film advancing means ineffective to advance the film during either forward motion projection or reverse motion projection; and
means for rendering the last said means operative for a predetermined time period to effect still projection of a selected frame of the film.

22. In a projector system for projecting image frames contained on a film, the combination comprising:
a film gate having a projection aperture;
means operative to advance film through said gate in a forward direction to successively position the image frames in alignment with said aperture to effect forward motion projection of the film;
first electrically operative means for modifying operation of said film advancing means to render the same operative to advance the film through said gate in a reverse direction to effect reverse motion projection of the film;
second electrically operative means for rendering said film advancing means ineffective to advance the film during either forward motion projection or reverse motion projection; and
manually actuatable switch means for first generating an operative signal for said second electrically operative means and then for said first electrically operative means in that required sequence, whereby automatically to permit modifying operation of said film advancing means only when said film advancing means is rendered ineffective to advance the film.

23. In a projector system as claimed in claim 22, wherein said means operative to advance the film comprises a film claw for moving through an in-and-out and up-and-down movement cycle relative to said gate to intermittently engage and advance the film through the gate, said first electrically operative means includes means for varying one of said movements relative to the other, and said second electrically operative means includes means for temporarily terminating one of said movements.

24. In a projector system for projecting image frames contained on a film, the combination comprising:
a film gate having a projection aperture;
means for advancing the film through said gate to successively position the image frames in alignment with said aperture to effect motion projection of the film;
mode changing means operative in response to electrical command signals for changing the mode of projection to a different mode;

means for effecting electrical command signals indicative of desired changes in the mode of projection; and automatically cyclically operable override means for rendering said command signals effective to operate said mode changing means only during predetermined conditions of said film advancing means.

25. In a projector system as claimed in claim 24 wherein the film contains code marks corresponding to frames to be still projected, and said means for effecting electrical command signals operates in response to detection of a code mark.

26. In a projector system as claimed in claim 24, wherein said means for effecting electrical command signals comprises manually actuatable switch means.

27. In a projector system as claimed in claim 24, wherein said means for effecting electrical command signals includes timer actuated switch means.

28. In a film projector system as claimed in claim 24 wherein said film advancing means comprises a film claw, and means for moving the film claw in-and-out and up-and-down relative to said film gate to intermittently engage and advance the film through said gate to effect motion projection of the film; and wherein said mode changing means comprises electrically operative means for rendering said claw effective or ineffective to engage and advance the film whereby to effect motion or still projection.

29. In a projector system as claimed in claim 28 wherein said override means comprises means for establishing a signal responsive circuit only during predetermined positions of said claw.

30. In a projector system as claimed in claim 28 wherein said override means comprises cyclically operated switch means controlled by cam means moving in synchronism with said claw.

31. In a projector system as claimed in claim 28 wherein said means for moving said claw in-and-out comprises a continuously rotating cam, and said mode changing means comprises an electrically operative member for holding the claw arm clear of the cam for still projection and releasing the claw for motion projection, and wherein said override means permits said member to initiate its hold or release of the claw arm only during predetermined portions of the rotational cycle of said cam, regardless of the time of a command signal.

References Cited

UNITED STATES PATENTS

| | | | |
|---|---|---|---|
| 1,944,024 | 1/1934 | Foster | 352—92 |
| 3,261,654 | 7/1966 | Faber | 352—173 X |
| 2,588,813 | 3/1952 | Dube | 352—173 |
| 2,896,524 | 7/1959 | Warzybok et al. | 352—140 X |
| 3,081,013 | 3/1963 | Walther | 226—57 X |
| 3,301,628 | 1/1967 | Hellmund | 352—169 X |

NORTON ANSHER, Primary Examiner

M. H. HAYES, Assistant Examiner

U.S. Cl. X.R.

352—137, 139, 140, 169, 173